United States Patent
Panchbudhe et al.

(10) Patent No.: US 10,503,920 B2
(45) Date of Patent: Dec. 10, 2019

(54) METHODS AND SYSTEMS FOR MANAGEMENT OF DATA STORED IN DISCRETE DATA CONTAINERS

(71) Applicant: ANOOSMAR TECHNOLOGIES PRIVATE LIMITED, Pune (IN)

(72) Inventors: Ankur Panchbudhe, Pune (IN); Praneeth Siva, Pune (IN); Amol Vaikar, Pune (IN); Yusuf Batterywala, Pune (IN)

(73) Assignee: VAULTIZE TECHNOLOGIES PRIVATE LIMITED, Pune (IN)

( * ) Notice: Subject to any disclaimer, the term of this patent is extended or adjusted under 35 U.S.C. 154(b) by 3 days.

(21) Appl. No.: 15/922,664

(22) Filed: Mar. 15, 2018

(65) Prior Publication Data
US 2018/0204018 A1 Jul. 19, 2018

Related U.S. Application Data

(63) Continuation-in-part of application No. 14/569,809, filed on Dec. 15, 2014, now Pat. No. 10,210,337.

(51) Int. Cl.
*G06F 21/62* (2013.01)
*G06F 21/31* (2013.01)
*G06F 9/455* (2018.01)

(52) U.S. Cl.
CPC .......... *G06F 21/6209* (2013.01); *G06F 9/455* (2013.01); *G06F 21/31* (2013.01)

(58) Field of Classification Search
CPC ...... G06F 21/31; G06F 21/6209; G06F 9/455; G06F 2221/2141; H04L 63/105; G06Q 10/08
See application file for complete search history.

(56) References Cited

U.S. PATENT DOCUMENTS

| | | | | |
|---|---|---|---|---|
| 2005/0177716 A1* | 8/2005 | Ginter | ...................... | G06F 21/10 713/157 |
| 2007/0162359 A1* | 7/2007 | Gokhale | ................ | G06Q 10/08 705/28 |
| 2007/0171921 A1* | 7/2007 | Wookey | ................ | G06F 3/1415 370/401 |
| 2010/0070725 A1* | 3/2010 | Prahlad | ............... | G06F 11/1453 711/162 |
| 2012/0066517 A1* | 3/2012 | Vysogorets | ............. | G06F 21/34 713/193 |
| 2015/0163206 A1* | 6/2015 | McCarthy | ........... | G06F 21/6227 713/171 |

* cited by examiner

*Primary Examiner* — Ashokkumar B Patel
*Assistant Examiner* — William B Jones
(74) *Attorney, Agent, or Firm* — Mannava & Kang, P.C.; Vinay Malik

(57) ABSTRACT

The embodiments herein relate to discrete data containers and, more particularly, to management of data stored in discrete data containers. Embodiments herein disclose methods and systems to update data present within a data container, when a user accessing the data, present within the data container, has updated the data. Embodiments herein disclose a method and system for enabling modifications of data present in data containers, wherein de-containerized data associated with a data container can be modified by at least one user and the modifications by the user can be reflected in real-time to the data in the data container.

14 Claims, 11 Drawing Sheets

METHODS AND SYSTEMS FOR MANAGEMENT OF DATA STORED IN DISCRETE DATA CONTAINERS

CROSS REFERENCE TO RELATED APPLICATION

This application is a CIP (Continuation-in-Part) in furtherance of U.S. application Ser. No. 14/569,809, the contents of which are incorporated herein by reference.

TECHNICAL FIELD

The embodiments herein relate to discrete data containers and, more particularly, to management of data stored in discrete data containers.

BACKGROUND

Data management is one of the prime areas of concern of the modern world. The term 'data management' does not just address way of organizing data, but also focuses on data security aspects. With the increasing popularity of 'Bring Your own Device (BYOD)' trend, which allows users to use their personal device for professional/official use as well, data security concerns are at peak. BYOD allows users to access official data, which is of confidential nature, from any location. Further, the personal devices of users may not possess sufficient security means to fight malware and similar fraudulent attacks, which poses high data security risk.

Information rights management (IRM) is a subset of technologies that protect sensitive information from unauthorized access such as digital rights management (DRM). It is also referred to as E-DRM or Enterprise Digital Rights Management. This can cause confusion, because digital rights management (DRM) technologies are typically associated with business to consumer systems designed to protect rich media such as music and video (for example, Apple's DRM for iTunes). IRM is a technology which allows for information to be 'remote controlled'. This means that information and its control can now be separately created, viewed, edited & distributed. A true IRM system is typically used to protect information in a business-to-business model, such as financial data, intellectual property and executive communications. IRM currently applies mainly to documents, emails and any other type of enterprise related data.

Data containerization is a technique/mechanism, which is used to protect data of confidential nature, from unauthorized access by creating an encrypted data store (aka container) on a device or within an app. But a container is not simply an encrypted file—for example, access to data in the container requires secure authentication independent of any other device settings or restriction. The result being that even on a device with no unlock pass-code, no whole device encryption, and no security policies of any type, the contents of the container remain inaccessible unless an authorized user enters valid credentials. Securing data in a container also allows an administrator to wipe all business data from a personal device without wiping any personal data or apps by simply deleting the container. Rather than making sure the entire device is secure—which can limit the end-user from being able to use a smart phone or tablet to its full potential—the containerization concept is to create a compartment within the device, where the corporate data and applications are segregated from the applications and data belonging to the user.

Existing data containerization technologies are restricted to static containers. It is not possible to update the contents of a data container while still keeping the data within the container. Owing to this, if the container is shared further or sent back to the owner who had shared it with the intent of gathering information (forms, for instance), the updates are not propagated. As a workaround, the changes may be saved in a file outside the container and then shared further, but this is extremely risky and prone to issues such as data leaks and so on.

Also, if the data on the device from which the container was downloaded is updated, say by the owner, the container with the end users continues to store stale data even if the owner of the data wishes to propagate the updated data.

BRIEF DESCRIPTION OF THE FIGURES

The embodiments herein will be better understood from the following detailed description with reference to the drawings, in which.

DETAILED DESCRIPTION OF EMBODIMENTS

Figure 1:
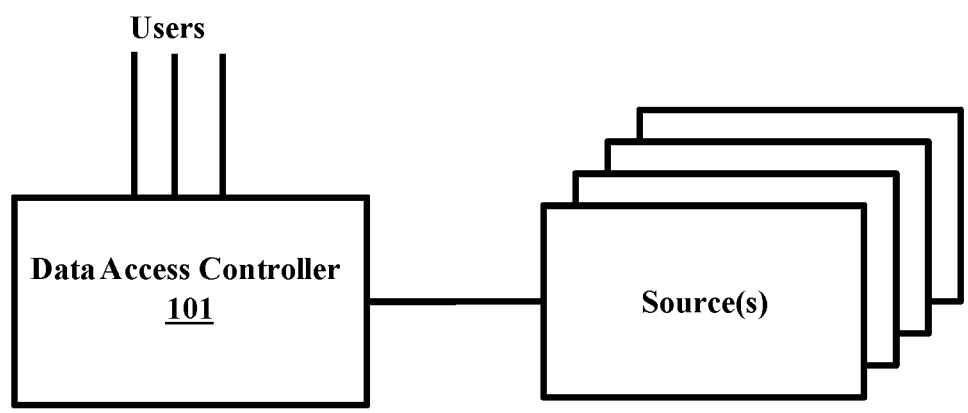
FIG. 1 illustrates a block diagram of a data management system, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for enabling modifications of data present in data containers, wherein de-containerized data associated with a data container can be modified by at least one user and the modifications by the user can be reflected in real-time to the data in the data container. Referring now to the drawings, and more particularly to FIGS. 1 through 10, where similar reference characters denote corresponding features consistently throughout the figures, there are shown embodiments.

FIG. 1 illustrates a block diagram of a data management system, as disclosed in the embodiments herein. The system comprises of a data access controller 101. The data access controller 101 can be connected to at least one source of data. Examples of the data can be information, software, emails and so on, wherein the data can be in the form of documents (Microsoft Office Formats, PDF, Open Document formats and so on), images, media files, lists (Comma Separated values, Spreadsheets), drawings, schematics, blue-prints and so on.

The source of data can comprise of at least one database, a server (such as a file server, a database server, a content management server, an application server and so on), a memory, the Cloud, a user device (such as a computer, a laptop, a mobile phone, a smart phone, a tablet, a wearable computing device, an IoT (Internet of Things) device, and so on), and so on.

The server can be any server/device configured to contain information; for example, a file server, a database server, a content management server, and so on. The memory can be a dedicated memory device such as a hard disk, a SSD (Solid State Drive) and so on. The memory can also be a part of a device associated with the enterprise network such as a desktop, a laptop, a device belonging to the user (such as in a BYOD (Bring Your Own Device) scenario) such as a mobile phone, a tablet, a personal computing device, a wearable computing device, an IoT (Internet of Things) device, and so on, wherein the data access controller 101 has access to the memory. The data can be in any location suitable for storing data relevant to the enterprise.

The data access controller 101 can interface with at least one device, wherein the user can use this at least one device to access the data. The device can be at least one of a computer, desktop, laptop, a tablet, a server (such as a file server, a database server, a content management server, an application server and so on), a mobile device (such as a mobile phone, tablet and so on), a wearable computing device, an IoT (Internet of Things) device, and so on. The user can be an employee, a contractor, an agent, a client or any person and/or organization/enterprise, attempting to access the data (with authorization from the enterprise who owns the data or without appropriate authorization).

An administrator can be authorized to access the data access controller 101, wherein the administrator can view the data, data containers comprising of at least one data, associated access and rights, change the associated access and rights and so on. The data containers can comprise of data spread across one or more sources.

In an embodiment herein, the data access controller 101 can be a dedicated device such as a server, which is connected to the source(s) of data. In another embodiment herein, the data access controller 101 can be present on a device/server (for example, as an application, plugin, extension and so on) and can perform analysis of the content of the data present on that device; assign access and rights to each set of data (based on the analysis of the content of the data) present on that device and control access to the data based on the access rights associated with the data present on that device. In another embodiment herein, the data access controller 101 can be present on a device/server (for example, as an application, plugin, add-on, extension, and so on) and can perform analysis of the content of the data present on that device and at least one other device; assign access and rights to each set of data (based on the analysis of the content of the data) present on that device and at least one other device and control access to the data based on the access and rights associated with the data present on that device and at least one other device. In another embodiment herein, the data access controller 101 can be a distributed device, wherein the functionality of the data access controller 101 is distributed over one or more devices; such as a server and a device used by the user and so on.

The data access controller 101 can be configured to manage the data containers. The data access controller 101 can be further configured to save information related to data attributes, which can be used by the data management system 100 to differentiate between different data. The data access controller 101 can be further configured to save user attributes, which can act as unique identifiers representing different users, and this information can be used by the system to differentiate between users to perform the containerization/de-containerization/re-containerization process. The data access controller 101 can be further configured to save any other data that is required to perform the containerization/de-containerization/re-containerization process.

The data access controller 101 can be configured to perform containerization/de-containerization/re-containerization of data based on rule(s) configured by the administrator, or by a machine based on settings configured by the administrator. The data access controller 101 can be further configured to perform de-containerization of data, based on access permissions configured for the user who is requesting data access. In another embodiment, the data access controller 101 can be configured to perform de-containerization of data, based on access permissions configured for a device, which is requesting data access. In a preferred embodiment, the data access controller 101 can perform data containerization at individual files or folder levels. The data access controller 101 can be further configured to allow or deny user access to data, based on rules/policies configured for that particular user and for the particular data container that the user is requesting. The data access controller 101 can be further configured to perform re-containerization of data, based on access permissions configured for the user who is requesting data access and operations being performed by the user. In another embodiment, the data access controller 101 can be configured to perform re-containerization of data, based on access permissions configured for a device, which is requesting data access. In a preferred embodiment, the data access controller 101 can perform data re-containerization at individual files or folder levels. The data access controller 101 can be further configured to allow or deny the user the ability to perform certain operations on the data container, based on rules/policies configured for that particular user and for the particular data container the user is performing operations on.

Figure 2:
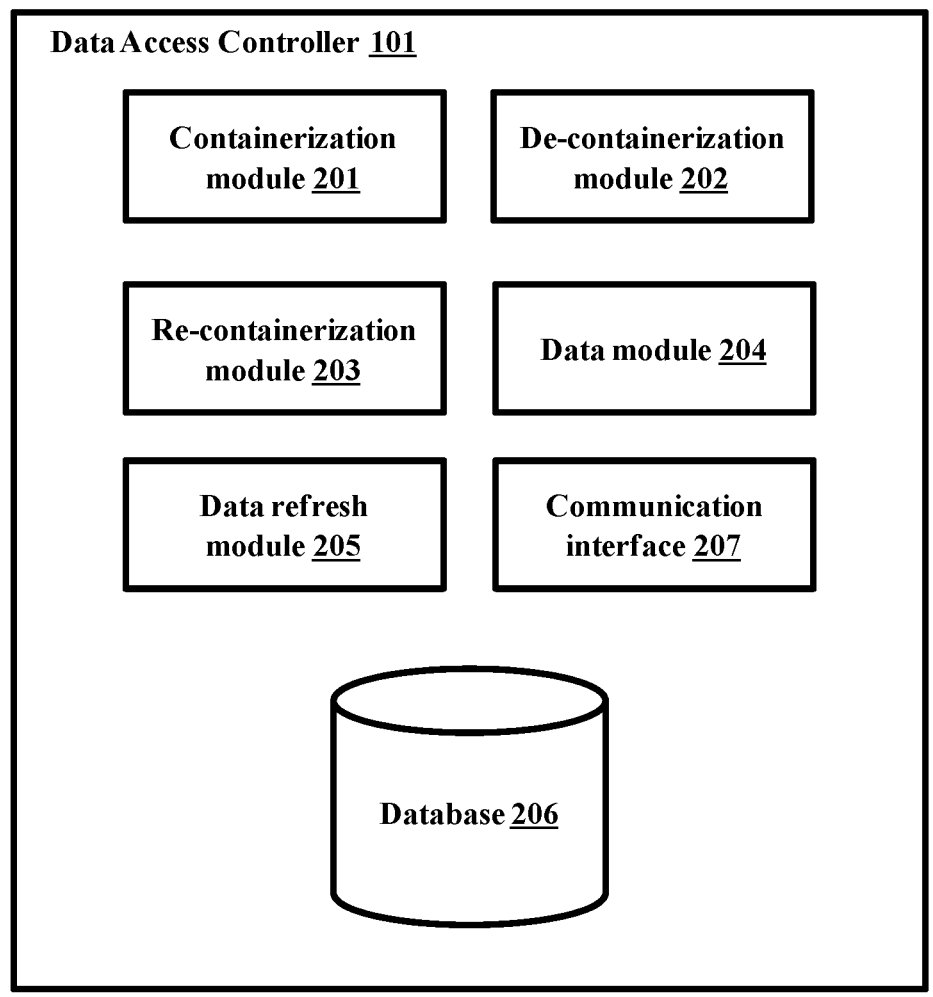
FIG. 2 illustrates a block diagram which depicts components of the data access controller, as disclosed in the embodiments herein.

FIG. 2 illustrates a block diagram that depicts components of the data access controller, as disclosed in the embodiments herein. The data access controller 101 further comprises of a containerization module 201, a de-containerization module 202, a re-containerization module 203, a data module 204, a data refresh module 205, a database 206, and a communication interface 207.

The communication interface 207 can enable the data access controller 101 to communicate with at least one external entity, such as a data source and so on. The communication interface 207 can comprise of a LAN (Local Area Network) interface, a WAN (Wide Area Network) interface, IPC (Inter Process Communication), a wireless communication interface (Wi-Fi, cellular communications, Bluetooth and so on), the Internet, a private network interface, a VPN (Virtual Private Network) and so on. The communication interface 207 can also enable the data access controller 101 to interact with other external entities such as user(s), administrator(s) and so on. The communication interface 207 can comprise of at least one of a web UI access, Application based Interface (API)-based access, FTP (File Transfer Protocol), SFTP (Secure FTP), FTPS (FTP Secure), SMTP (Simple Mail Transfer Protocol), CIFS/SMB (Common Internet File System/Server Message Block), NFS (Network File System), CIMS (Content Management Interoperability Services), ActiveSync, DAV (Distribution Authoring and Versioning), WebDAV, HTTP (Hypertext Transfer Protocol), HTTPS (HTTP Secure) and so on.

The database 206 can be a memory storage location, wherein the database 206 can be a pure database, a memory store, an electronic storage location, the Cloud, and so on. The database 206 can be located locally with the data access controller 101. The database 206 can be located remotely from the data access controller 101, wherein the data access controller 101 can communicate with the database 206 using a suitable means such as LAN, a private network, a WAN, the Internet, Wi-Fi and so on. The database 206 can comprise of policy rule(s) (as set by the administrator) for the data containers, default policy rule(s) for the data containers, and so on.

The containerization module 201 can be configured to receive requests and commands with respect to data containerization, and containerize data based on rules/policies configured for data containerization, using a suitable encryption technique. In an embodiment, the containerization module 201 can be configured to collect rules required for data containerization from the user and/or a machine, by providing a suitable interface. The containerization module 201 can be configured to assigns rights to the data present in the data containers, on a per user basis and/or a group of users, based on inputs from the administrator and/or in an automatic manner. The In another embodiment, the containerization module 201 can be configured to collect rules required for data containerization from the data access controller 101. In an embodiment, the containerization module 201 can be capable of executing one or more data containerization modes. In another embodiment, the containerization module 201 can select a suitable mode of data containerization, based on pre-defined parameters, wherein the parameters can be pre-defined by the administrator. A few examples of parameters that can be considered by the containerization module 201 are, but not limited to, type of data, and information regarding containerization mode used for same/similar type of data in the past based on history data that can be maintained in the data access controller 101. The containerization module 201 can be further configured to identify duplicate data and to select at least one of a full or partial compression technique to containerize the data. By using the partial compression technique for repeated data, the containerization module 201 can ensure that the same data is not compressed and saved twice, thereby saving storage space and effort.

The de-containerization module 202 can be configured to perform authentication check of a data access request received from a user, or from a machine through an Application Programming Interface (API). The de-containerization module 202 can be configured to retrieve rights and/or policies associated with the data containers from the data module 204. The de-containerization module 202 can interpret the rights and/or policies in an appropriate manner, as received from the data module 204. The de-containerization module 202 can also receive interpreted rights and/or policies from the data module 204. The de-containerization module 202 can be further configured to perform, upon successful authentication of user and data request received from the user, de-containerization of data requested by the user. The de-containerization module 202 can be configured to use any suitable decryption technique for the purpose of de-containerizing the data. The de-containerization module 202 can be further configured to perform de-duplication and compression of data. If the rights and/or policies enable the user to update the data, the de-containerization module 202 can trigger the re-containerization module 203.

The re-containerization module 203 can be configured to check if a user who is currently accessing the data container, is allowed to perform an operation on the data in the container. Examples of the operation can be editing, printing, saving and so on. Editing can comprise of the user adding data, deleting data, modifying data and so on. If the user is allowed to perform an operation on the data, the re-containerization module 203 can appropriately make changes to the encrypted data within the container when the user makes any edits, by reflecting the edits made by the user. Depending on the permissions and configuration, the re-containerization module 203 can also update the data refresh module 205 with the modified data thus creating a new version of the file on the server. In an embodiment herein, the re-containerization module 203 can further add encryption to the data, as required. The re-containerization module 203 can also enable versioning of the data being accessed by the user.

The data module 204 can manage the data present in the sources, the data containers and so on. The data module 204 can maintain information related to the users, the rights assigned to each of the users and so on. The data module 204 can store the data in the database 206. On receiving a request from at least one other module (which can be any one of the containerization module 201, the de-containerization module 202 or the re-containerization module 203), the data module 204 can retrieve the rights and/or policies and provide the rights and/or policies to the requesting module. On receiving a request from at least one other module (which can be any one of the containerization module 201, the de-containerization module 202 or the re-containerization module 203), the data module 204 can retrieve the rights and/or policies and check if the user has the adequate rights under the retrieved rights and/or policies and provide the results of the check to the requesting module. On receiving a request from the re-containerization module 203, the data module 204 can retrieve the rights and check if the user has the adequate rights.

The data refresh module 205 checks if there is a newer version of data available for a data container, being accessed by a user. The newer version of data can be caused by edits being done by the user and/or another user, who is accessing the same data container. The data refresh module 205, depending on the permissions enforced on the data container, can fetch the latest version of the data into the container discarding the original data, thus keeping the container up-to-date with latest information while still enforcing the rights granted to the user over the container.

In an embodiment herein, before the de-containerization module 202 initiates the process of de-containerizing data containers, the de-containerization module 202 can check with the data refresh module 205, if there is an updated version of data present in the data containers available with the data module 205 and/or the sources. If there is an updated version of the data available, the de-containerization module 202 can check if the rights and/or policies enable the user accessing the data to access the updated version. If the rights and/or policies do not enable the user accessing the data to access the updated version, the de-containerization module 202 can de-containerize the non-updated data present in the data containers and enable the user to access the de-containerized data. If the rights and/or policies enable the user accessing the data to access the updated version, the de-containerization module 202 can trigger the containerization module 201, wherein the containerization module 201 can containerize the updated data and provide it to the de-containerization module 202 and/or the data module 204. The containerization module 201 can update the data container with the updated version of the data. The containerization module 201 can update the data container with the updated version of the data by modifying corresponding non-updated data present with the data containers. The containerization module 201 can update the data container with the updated version of the data by discarding the corresponding non-updated data present with the data containers. The containerization module 201 can update the data container with the updated version of the data by adding the updated version of the data to the data containers, with a suitable means to indicate to the user that this is the updated version of the data (such as at least one label and/or tag, a modified file name and so on), which can indicate information such as date of updation of the data, user who did the updation of the data and so on. The de-containerization module 202 can then, de-containerize the non-updated data present in the data containers and enable the user to access the de-containerized data.

Figure 3:
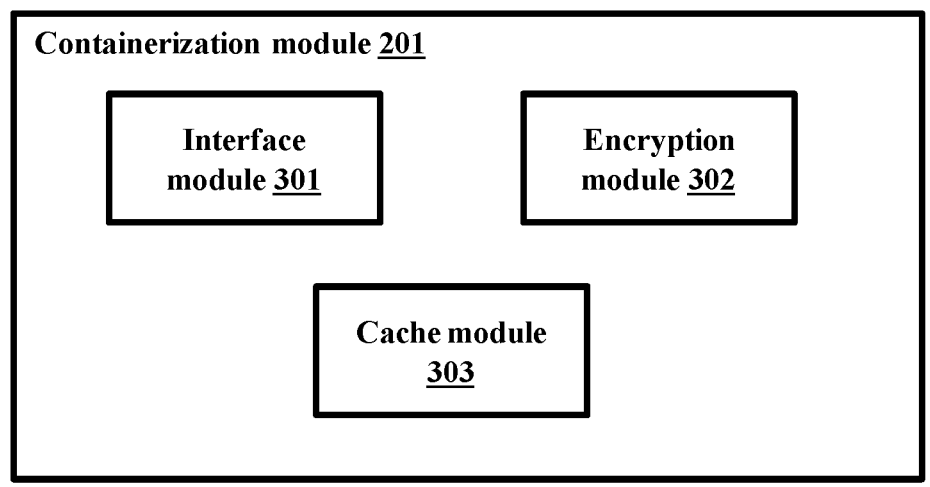
FIG. 3 is a block diagram illustrating the containerization module, as disclosed in the embodiments herein.

FIG. 3 is a block diagram illustrating the containerization module, as disclosed in the embodiments herein. The containerization module 201 further comprises of an interface module 301, an encryption module 302, and a cache module 303. The interface module 301 can be configured to provide means for the containerization module 201 to establish communication with data access controller 101, the data module 204 and the sources, for the purpose of collecting data required for the purpose of data containerization. A few examples of the data that can be collected using the interface 301 module are, but not limited to, user request pertaining to the data containerization process, related user rights, related data attributes, passwords, secrets, additional identity information, and rules. The term 'rule' can refer to at least one setting or configuration that can govern the data containerization process.

The encryption module 302 can be configured to use suitable data encryption means to encrypt the data selected by the user. In various embodiments, the containerization module 302 can use one or more encryption techniques for the purpose of encrypting the data, and suitable encryption technique can be selected based on at least one parameter as configured by the user.

The cache module 303 can collect from the data access controller 101 and temporarily save, data required for the purpose of containerizing the data. For example, the cache module 303 can collect information such as, but not limited to data attributes, user attributes, and rule for data containerization, which is specific to the user who provided the data containerization request and the data selected for containerization purpose. In various embodiments, the data collected and saved in the cache module 303 can be erased upon receiving a user command, or automatically upon successful completion of the data containerization process. In another embodiment, the data can be erased from the cache module 303 while the data containerization is in progress.

In an embodiment herein, the de-containerization module 202 and/or the data module 204, on detecting a new version of data present in a data container, can trigger the containerization module 201. The de-containerization module 202 can detect the new version of the data. The re-containerization module 203 can also detect the new version of the data. The containerization module 201 can containerize the updated data and can provide the containerized updated data to the de-containerization module 202 and/or the data module 204.

Figure 4:
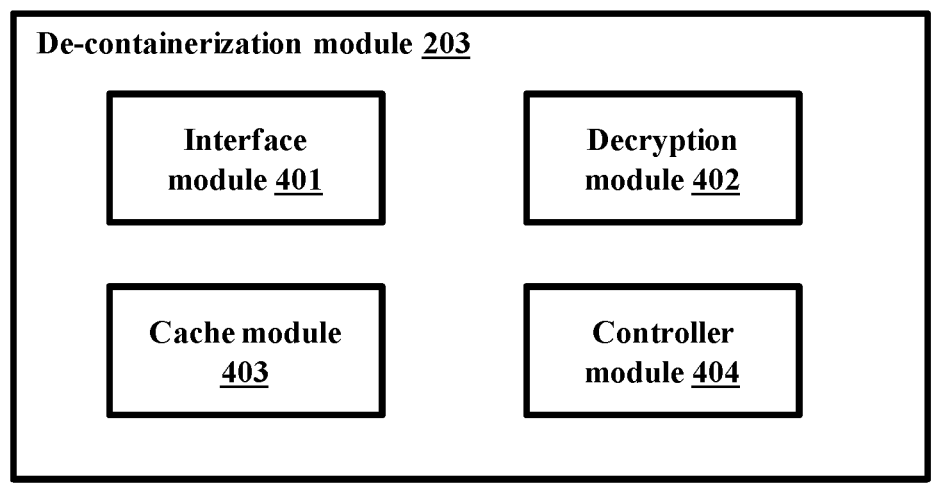
FIG. 4 is a block diagram illustrating the de-containerization module, as disclosed in the embodiments herein.

FIG. 4 is a block diagram illustrating the de-containerization module, as disclosed in the embodiments herein. The de-containerization module 202 further comprises of an interface module 401, a decryption module 402, a cache module 403, and a controller module 404. The interface module 401 can be configured to provide means for the de-containerization module 202 to establish communication with data access controller 101, the containerization module 201, the data module 204, the data refresh module 205, and the user device 102, for the purpose of collecting data required for the purpose of data de-containerization. A few examples of the data that can be collected using the interface module 401 are, but not limited to, user request to access a particular data, related user attributes, the level of access available to the user, passwords, secrets, additional identity information, related data attributes, and rules.

The decryption module 402 can be configured to check, upon receiving a data request from a user, whether that particular user is authorized to access the data. The decryption module 402 can be further configured to check access permission granted for the user, for the data being considered. The decryption module 402 can check with at least one other user and/or the administrator. For example, while one user can be given only 'read' permission, the other user can be given read and edit permissions and so on. Further, the read and/or the edit permissions can be restricted at a content, page, and/or paragraph levels. The decryption module 402 can be further configured to use, upon verifying that the user has permission to access the data, suitable data decryption means to de-containerize the data selected by the user. In various embodiments, the de-containerization module 402 can use one or more decryption techniques for the purpose of decrypting the data, and at least one suitable decryption technique can be selected based on at least one parameter configured by the administrator.

In an embodiment herein, before making the data available to the user, the controller module 405 can check with the data module 204 to check if there are updated versions of the data available with the sources and/or the data module 204 as against the version originally containerized, by providing information such as container version number, the date and time of creation of the data container and so on. If updated versions of the data are available, the decryption module 402 can trigger the containerization module 201 (directly or by providing an indication to the data module 204). On receiving the updated data container, the controller module 405 can proceed to perform de-containerization of the data container. This ensures that the user can always get the latest data from the data container.

The cache module 403 can collect from the data access controller 101 and temporarily save, data required for the purpose of de-containerizing the data. For example, the cache module 403 can collect information such as, but not limited to data attributes, user attributes, and rule for data de-containerization which is specific to the user who provided the data de-containerization request and the data selected for de-containerization purpose. In various embodiments, the data collected and saved in the cache module 403 can be erased upon receiving a user command, immediately as and when the de-containerization is happening, or automatically upon successful completion of the de-containerization process.

Figure 5:
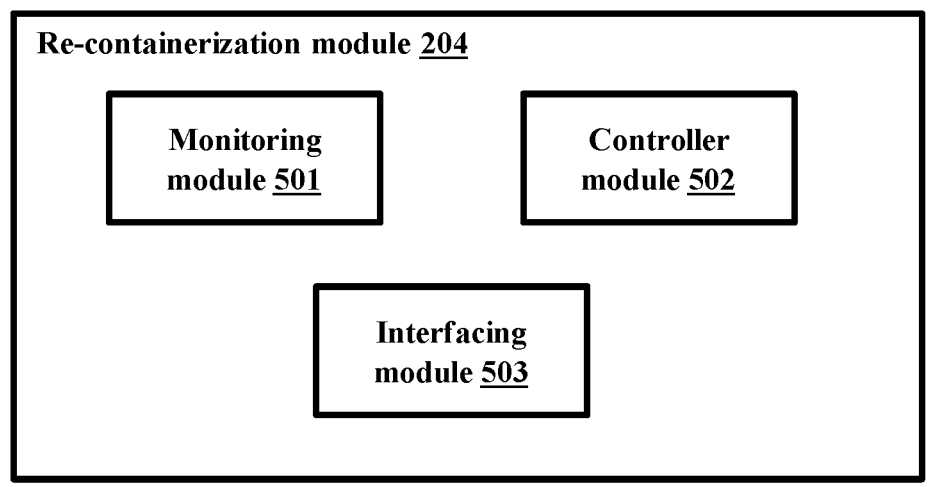
FIG. 5 is a block diagram depicting the re-containerization module, according to embodiments as disclosed herein.

FIG. 5 is a block diagram depicting the re-containerization module, according to embodiments as disclosed herein. The re-containerization module 203, as depicted, comprises of a monitoring module 501, a controller module 502, and an interfacing module 503. The interfacing module 503 can enable the re-containerization module 203 to interface with the sources, the data module 204, the data refresh module 205, users, the administrator, the re-containerization module 201, and so on. The interfacing module 503 enables the user to access the data containers, make edits to the data containers and so on. The interfacing module 503 also enables the administrator to set rights and/or polices, monitor the data containers, review the data containers and so on, with respect to the data containers.

The monitoring module 501, on being triggered by the de-containerization module 202, can monitor the de-containerized data. The user can be currently accessing the data. The monitoring module 501 can use a suitable means such as filter drivers, file system watchers, application plugins (wherein the application can be used by the user to access the data), file/data scanning or any other equivalent means to monitor the data. On detecting any modifications to the data, the monitoring module 501 can capture the data. The monitoring module 501 can capture the data in real-time. The monitoring module 501 can also capture the data at pre-defined intervals, wherein the administrator can define the pre-defined intervals. The monitoring module 501 can also capture the data on a pre-defined event occurring, wherein the event can be the user modifying the data, and so on.

On capturing the data, the monitoring module 501 can send the data to the controller module 502. The controller module 502 can also check for duplicates in the data. The controller module 502 can check for duplicates among the data present in the data containers and the data currently being accessed by the user. On detecting any duplicates, the controller module 502 can remove the duplicates from the data by performing de-duplication. The controller module 502 can further check if the data requires compression and encryption. The controller module 502 can perform compression, if the data requires compression. The controller module 502 can perform compression, if the administrator sets an option. The administrator can set the option such as if the data size exceeds a pre-defined limit, and so on. The controller module 502 can perform encryption, if required. The administrator can define the encryption based on at least one option such as data type, data size, user and so on. The administrator can also define the encryption for all data. The encryption used by the controller module 502 can be the same encryption used originally for the data present in the data container. The encryption used by the controller module 502 can be a different encryption from the encryption used for the data present in the data container. The controller module 502 can then send an indication to the data module 204, using the interfacing module 503, wherein the indication can comprise of the updated data, metadata related to the updated data (such as the user who updated the data, the date and time that the user updated the data and so on).

Figure 6:
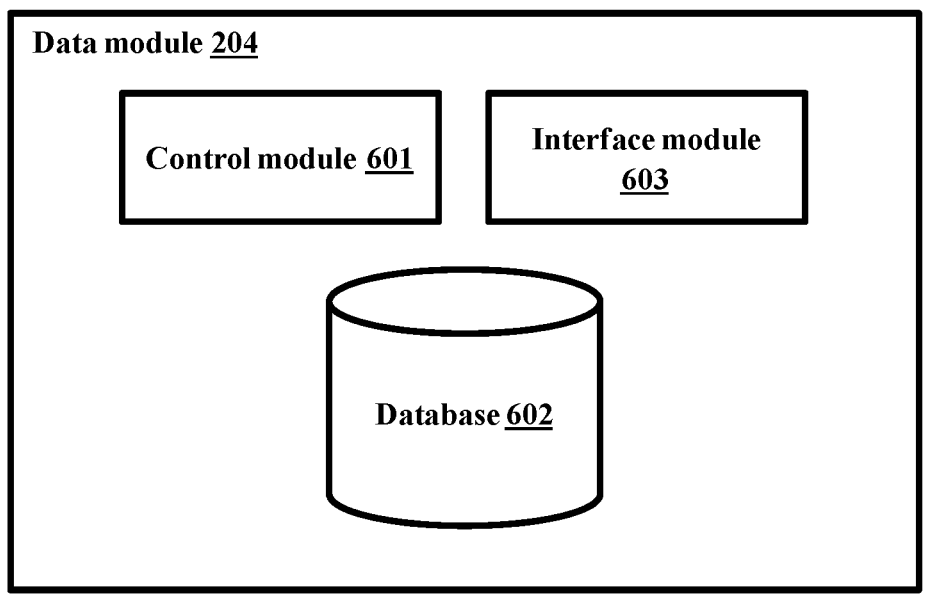
FIG. 6 is a block diagram depicting the data module, according to embodiments as disclosed herein.

FIG. 6 is a block diagram depicting the data module, according to embodiments as disclosed herein. The data module 204, as depicted comprises of a control module 601, a database 602, and an interface module 603. The database 602 can be a memory storage location, wherein the database 602 can be a pure database, a memory store, an electronic storage location and so on. The database 602 can be located locally with the data module 204. The database 602 can be located remotely from the data module 204, wherein the data module 204 can communicate with the database 602 using a suitable means such as LAN, a private network, a WAN, the Internet, Wi-Fi and so on. The database 602 can comprise of policy rule(s) (as set by the administrator), default policy rule(s), and so on. The interface module 603 can enable the data module 204 to interface with the sources, the containerization module 201, the de-containerization module 202, the re-containerization module 203, the administrator, and so on.

The control module 601 can be configured to manage the data present in the sources, the data containers and so on. The control module 601 can maintain information related to the users, the rights assigned to each of the users and so on. The control module 601 can store the data, rights and/or policies in the database 602. On receiving a request from at least one other module (which can be any one of the containerization module 201, the de-containerization module 202 or the re-containerization module 203), the control module 601 can retrieve the rights and/or policies from the database 602 and provide the rights and/or policies to the requesting module. On receiving a request from at least one other module (which can be any one of the containerization module 201, the de-containerization module 202 or the re-containerization module 203), the data module 204 can retrieve the rights and/or policies, check if the user has the adequate rights under the retrieved rights and/or policies and provide the results of the check to the requesting module.

The control module 601 can receive the indication from one other module (such as the re-containerization module 203 or the de-containerization module 202), through the interface module 603. The indication can comprise of the updated data, metadata related to the updated data (such as the user who updated the data, the date and time that the user updated the data and so on). On receiving the indication, the control module 601 can trigger the containerization module 201 using the interface module 603. The trigger can comprise of the updated data, metadata related to the updated data (such as the user who updated the data, the date and time that the user updated the data and so on). The control module 601 can also store information such as the updated data, metadata related to the updated data (such as the user who updated the data, the date and time that the user updated the data and so on) in the database 602.

Figure 7:
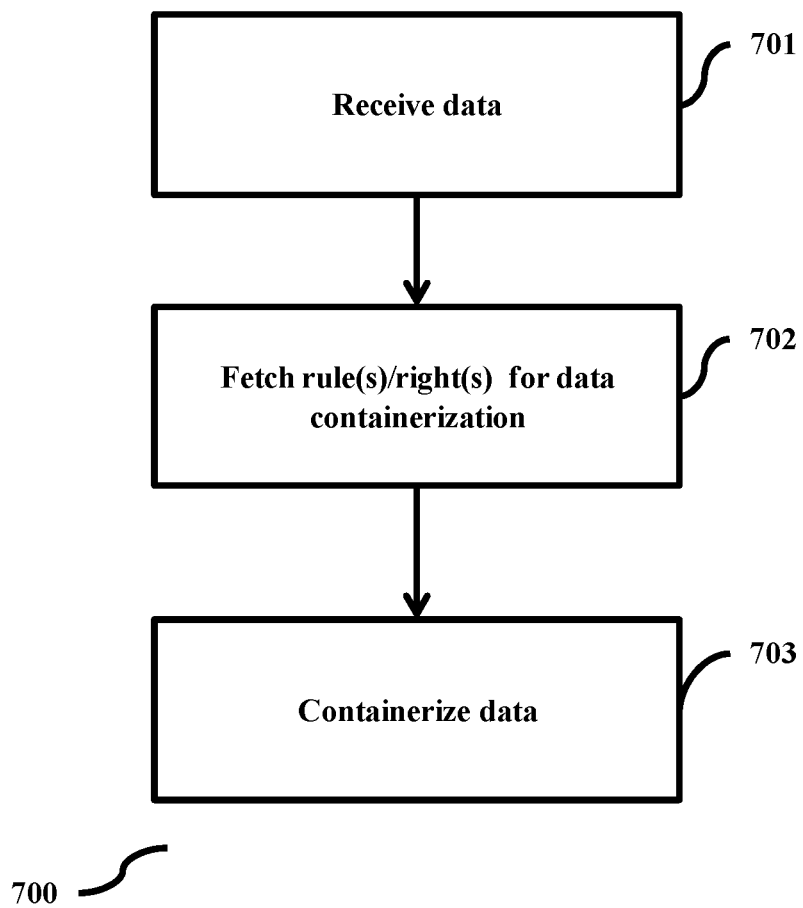
FIG. 7 is a flow diagram which shows steps involved in the process of containerizing data, as disclosed in the embodiments herein.

FIG. 7 is a flow diagram that shows steps involved in the process of containerizing data, as disclosed in the embodiments herein. Initially, the data access controller 101 receives (701) data to be containerized. In an embodiment, the user can upload the data to be containerized, to the data access controller 101 and the data access controller 101 can store the data received from the user, in the data access controller 101 or in any other associated storage medium, which can be internal or external to the data management system 100. In another embodiment, if the data is already available in the data access controller 101 or any other storage medium associated with the data access controller 101, the user can, using a suitable user interface, select the data to be containerized. The data access controller 101 provides suitable option (s) for the user to initiate data containerization process, using suitable user interface associated with the interface module 301. The data access controller 101 can further provide suitable option (s) for the user to configure rule (s) to be used for the purpose of containerizing the data. In an embodiment, the user can define and configure at least one new rule. In another embodiment, the user can select, from a pre-defined set of rules, at least one rule for the purpose of data containerization. The containerization module 201 fetches (702) the rule (s) selected by the user, and further selects a suitable data containerization technique for the purpose of data containerization. Selecting suitable data containerization technique can involve choosing at least one suitable setting or configuration that helps to perform discrete data containerization as specified by a user. Selecting the encryption mechanism can also involve identifying at least one suitable encryption mechanism for the purpose of encrypting the data being containerized. In an embodiment, the encryption can be made optional. Further, using the selected setting or configuration, the encryption module 302 in the containerization module 201 containerizes (703) the selected data, wherein the containerization involves containerizing the data at individual data and/or folder level. To containerize the data, the containerization module 201 reads the data and/or its meta-data from a data source using the interface module 301. The encryption module 302 then parses and interprets the meta-data and the contents of the data and determines at least one attribute of the data, using at least one technique such as, but not limited to data mining, content analysis, file system meta-data and message headers. This might also require communicating with other modules including Server and/or third-party modules (e.g. Active Directory, LDAP, content management systems). Further, the attributes can include, but not limited to name of the data, folder or container names, device name and other device information, tags, labels, topics, subject, date-time parameters, owner and user information, user groups, geo-location information, sender and receiver information, data ACL (Access Control Lists), keywords, key phrases, categories, patterns and so on. The containerization module 301 then sends all or some of the collected data attributes and/or data, to the data access controller 101 to retrieve at least one containerization parameter, wherein the containerization parameter can involve at least one of rights associated with the data, and a derivation of the rights, or any such suitable parameter.

The data access controller 101, based on the received data attributes and/or data, determine at least one right to be applied for any or combination of the attributes. This is done based on at least one Policy and Right, which are pre-defined and pre-configured by the user or an administrator. The data access controller 101 then sends back either the rights or a derivation of them to the Containerization module 201. A few examples of the rights are:

List/Browse: Can list the data items in the container (e.g. files in a folder)—which items can be listed (or are visible) will depend on access parameters (see de-containerization). For example, certain files could be visible only in certain geography or IP address range.

Create: Can add a new data in the container, like a file to a folder.

View/Open: Can open or view the data inside the container with specified conditions including how the data is viewed/opened. For example, it can be viewed only 2 times, or only once a day, or it can be viewed only in certain formats (e.g. PDF), or it can be viewed only in USA, or only within the branch office network defined by IP and Wi-Fi, or only in a watermarked form, or in a steganographic form, or it can be opened only in MS Word. This could also include how the second user can interact with the data including things like copy-paste of data or content, screenshot, print and email.

Edit: Can edit/update data. This could also include which parts of data can be updated or limiting features like annotation or enforcing things like track/highlight changes.

Upload/Sync: Can upload or sync back (changed) data back to Server and/or Containerization module and/or first user Delete: Can delete data inside the container Share: Can share data with some other user and how the sharing happens. For example, sharing can be done only in containerized form, or only as PDF, or only within some geography or IP ranges.

Comment: Can comment on the data or annotate it

Copy/Download: Can copy/download data outside the container

Download as Container file: Can copy/download data outside as another container

Refresh: Can receive an updated version of the data inside container (from Server or Containerization module)

Offline access: Can access the data when not connected to Server or Containerization module Approval: Requires approval from Server and/or Containerization module and/or first user to open/view/etc.

Self-destruct: Destruct or corrupt the container when certain conditions are met. For example, when container moves outside corporate network or to a hostile country Expiry: Expire or disable the container after some time or after some number of accesses.

Use as attachment: Can attach the container or file(s) in it as attachment to messages or emails.

The containerization module 201 receives the rights or derived parameters from the data access controller 101 and determines, whether any further user input (s) is required and allowed. If user input is allowed and required, the same is collected through the interface module 301. The user input is combined with the data received from the data access controller 101 to determine the final set of parameters to be used for containerizing the data. If the final parameters indicate that containerization is not allowed or not required, then the process stops, and the user is given an appropriate response through the interface module 301.

If the final parameters indicate that data containerization is allowed and is required, the encryption module 302 is used to encrypt the data and, optionally, the corresponding meta-data, attributes and rights. In the encryption procedure, the choice of encryption method and encryption keys by the encryption module 302 can be based on fixed or random options or can be based on the data attributes. The encryption module 302 then produces an encrypted package containing the data and possibly, the meta-data, attributes and rights, in an encrypted form.

Result of the containerization process can be the data along with data pertaining to parameters such as, but not limited to rules, settings, information about user and/or data and/or device, authentication, authorization, policies, and settings. For example, if the data to be containerized is a folder with 10 files in it, the containerized data can be a folder that contains 10 individual/separate containers in it. In an embodiment herein, the containerization module 201 can perform data containerization at device, application, and individual data levels. The various actions in method 700 can be performed in the order presented, in a different order or simultaneously. Further, in some embodiments, some actions listed in FIG. 7 can be omitted.

Figure 8:
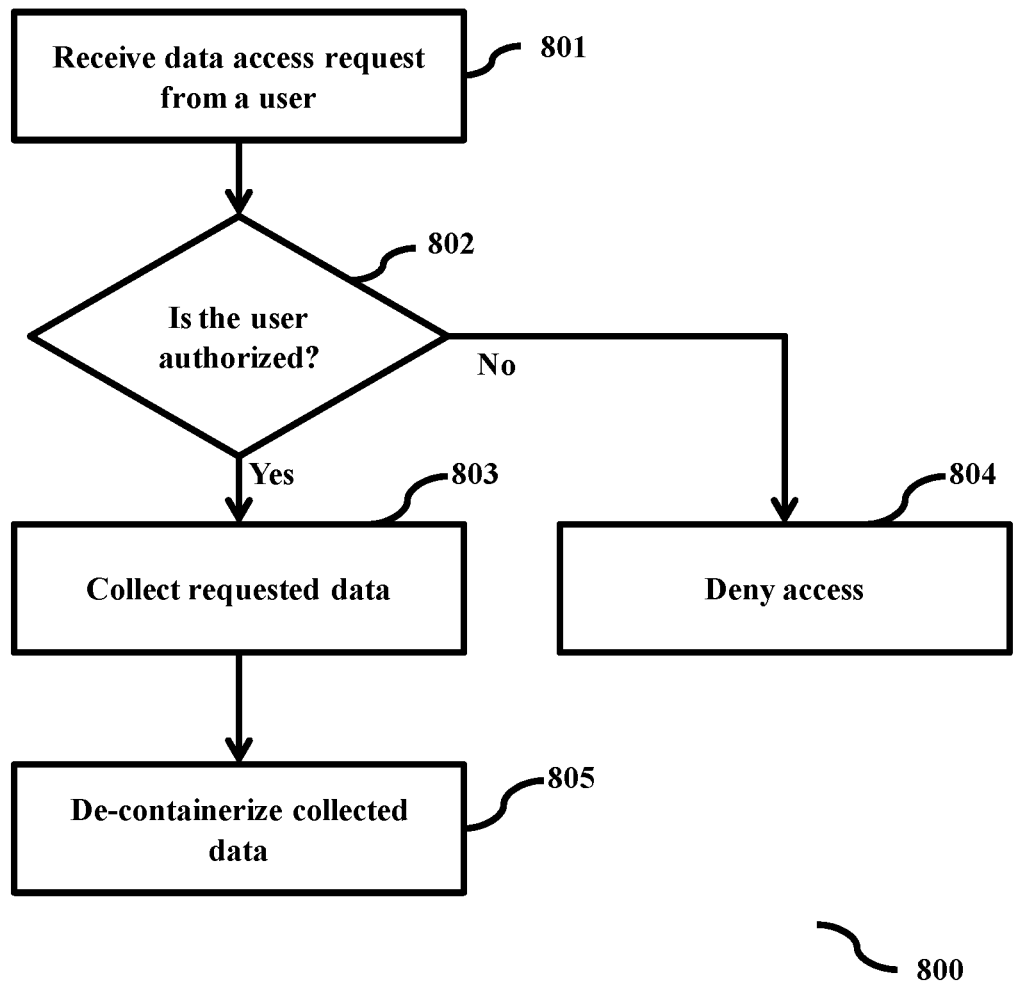
FIG. 8 is a flow diagram which shows steps involved in the process of de-containerizing data, as disclosed in the embodiments herein.

FIG. 8 is a flow diagram that shows steps involved in the process of de-containerizing data, as disclosed in the embodiments herein. The de-containerization module 202 receives (801) a data access request from the user, and processes the received request to identify the data the user is requesting access to. In an embodiment, the data access request can comprise of a unique identifier, which represents the data the user is trying to access. The de-containerization module 202 further checks (802) whether the user is authorized to access the data. In an embodiment, the de-containerization module 202 can perform the authentication check based on at least one attribute such as but not limited to user attributes, data attributes, device attributes, and access type attributes. In a preferred embodiment, the user access permissions to selected data can be pre-defined in terms of the user attributes corresponding to the user, data attributes corresponding to the selected data, and device specific attributes. In another embodiment, the user access permissions can vary/defined dynamically, based on real time interactions with the containerization module 201, or with the real time inputs provided by the owner/creator/admin of the data. If the user is not authorized to access the data, the de-containerization module denies (803) user access to the selected data. If the user is found to have access permission to the selected data, the de-containerization module 202 collects (804) the selected data from the data repository, which can be the data access controller 101. Further, the decrypting module 402 in the de-containerization module 202, using a selected decrypting mechanism, de-containerizes (805) the selected data. In an embodiment, the user who defined the access permissions can also set editing permissions for each user. The editing permission(s) can define types of action(s) a person who is accessing the data can perform on the data. For example, if the editing permission allows a user to perform only read & write functions, and not sharing function, the person who accesses the data can only perform read/write operations on that particular data, and cannot have permission to share the data. In various embodiments, the access and edit rights can be defined at a folder level, a file level, and/or individual content level. For example, the access rights can be configured such that a user can be allowed to edit only a particular paragraph in a particular page. Similarly, rights can be defined such that the user can print only a particular page, and only with a particular watermark. The various actions in method 800 can be performed in the order presented, in a different order or simultaneously. Further, in some embodiments, some actions listed in FIG. 8 can be omitted.

Figure 9:
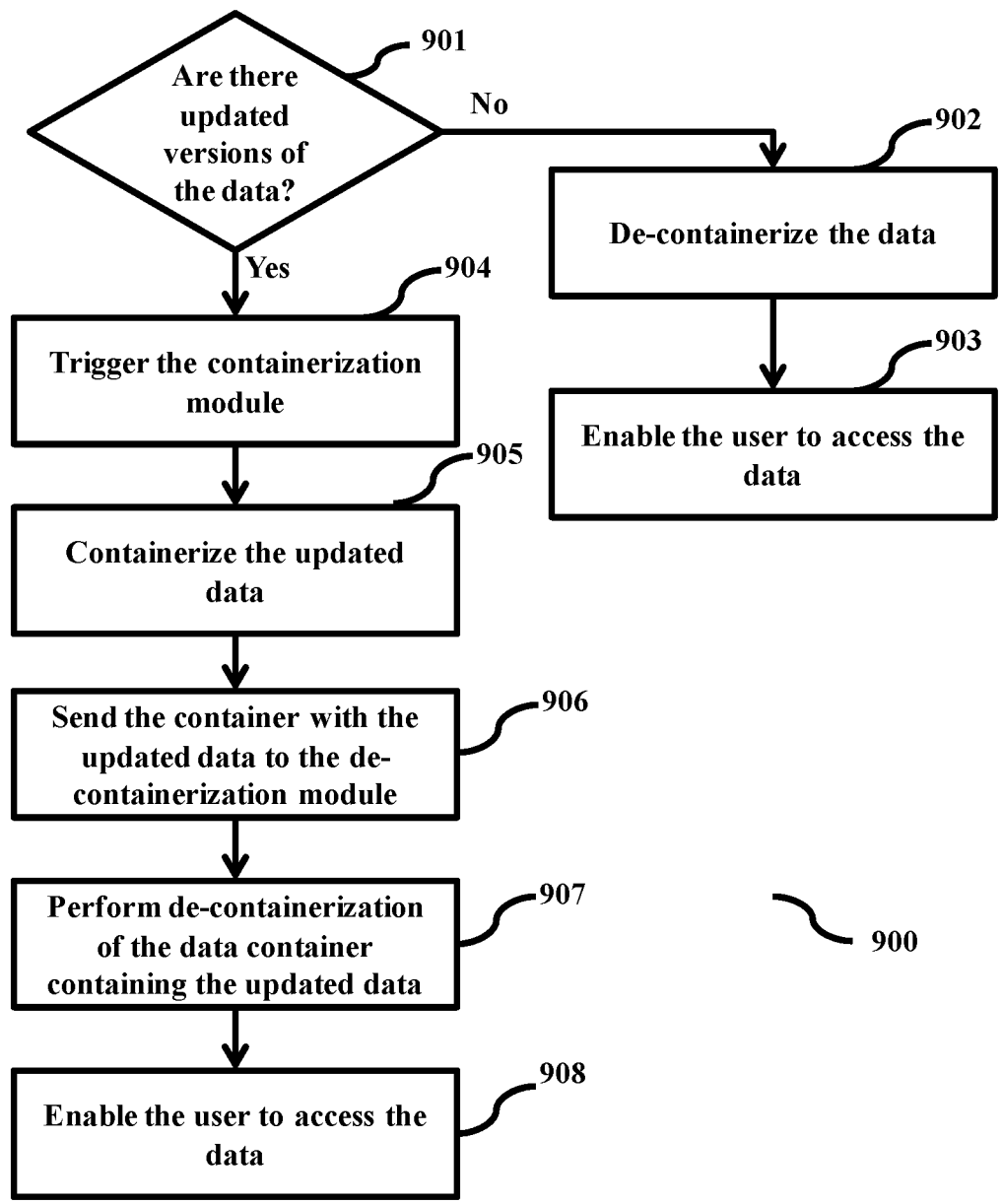
FIG. 9 is a flowchart depicting the process of de-containerizing data when the data has been updated, according to embodiments as disclosed herein.

FIG. 9 is a flowchart depicting the process of de-containerizing data when the data has been updated, according to embodiments as disclosed herein. Before making the data available to the user, the de-containerization module 202 checks (901) if there are updated versions of the data available with the sources and/or the data module 204 as against the version originally containerized, by providing information such as container version number, the date and time of creation of the data container and so on. If updated versions of the data are not available, the de-containerization module 202 performs (902) de-containerization of the data and enables (903) the user to access the data. If updated versions of the data are available, the de-containerization module 202 triggers (904) the containerization module 201 (directly or by providing an indication to the data module 204) by providing information such as the updated data to the containerization module 201. The containerization module 201 containerizes (905) the updated data and sends (906) the container comprising of the updated data to the de-containerization module 202 (directly or through the data module 204). On receiving the updated data container, the de-containerization module 202 performs (907) de-containerization of the data container containing the updated data and enables (908) the user to access the data. This ensures that the user can always get the latest data from the data container. The various actions in method 900 can be performed in the order presented, in a different order or simultaneously. Further, in some embodiments, some actions listed in FIG. 9 can be omitted.

Figure 10A:
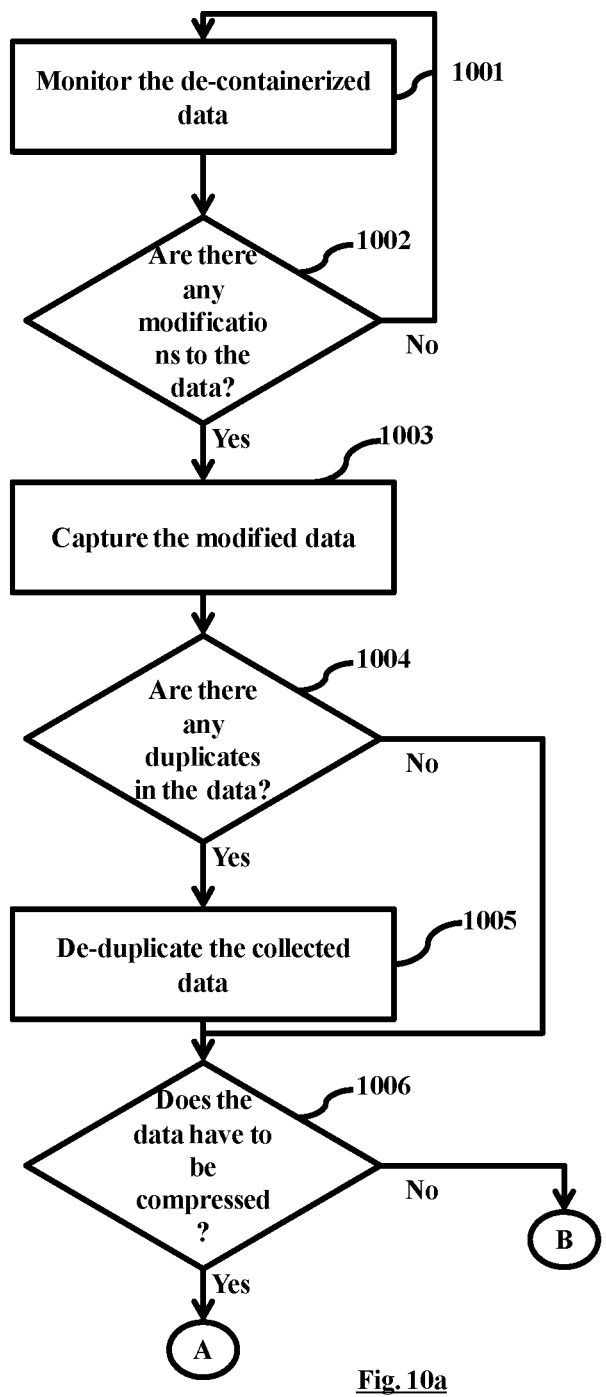
FIGS. 10a and 10b are flowcharts depicting the process of re-containerizing data when the data has been updated, according to embodiments as disclosed herein.
Figure 10B:
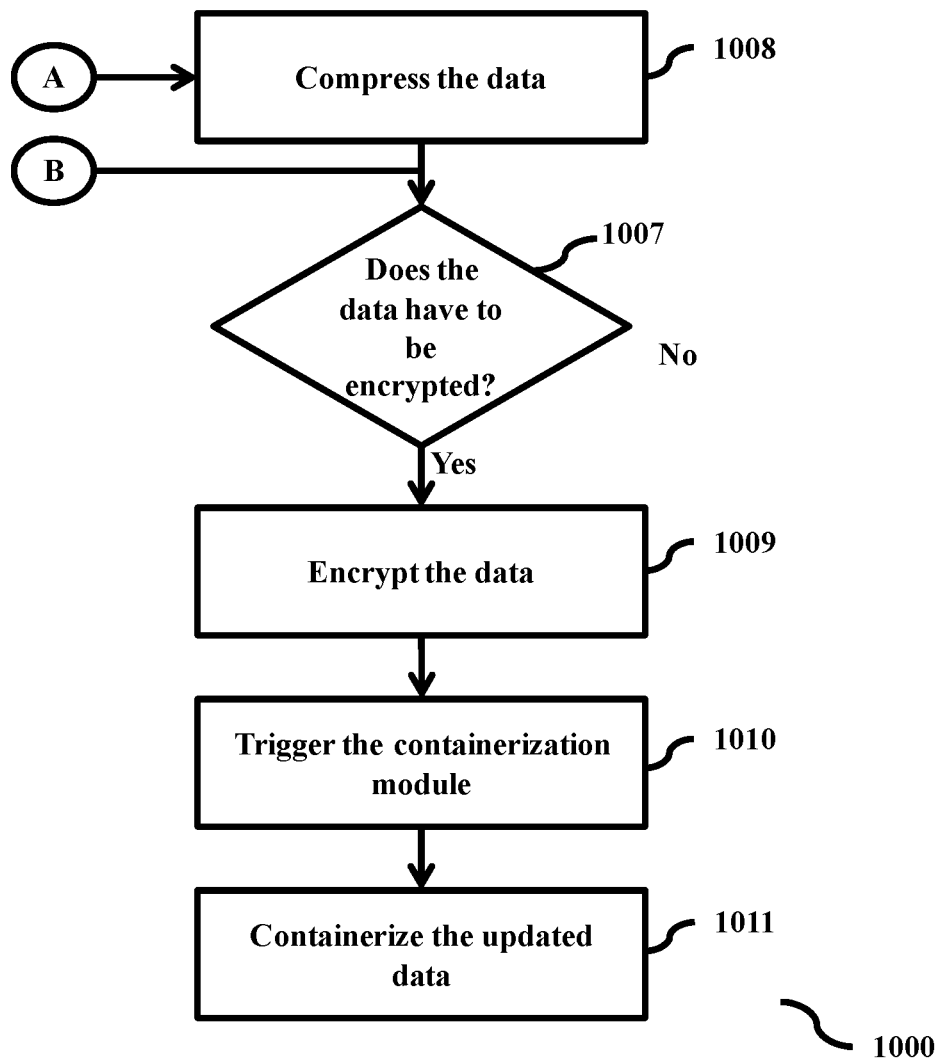

FIGS. 10*a* and 10*b* are flowcharts depicting the process of re-containerizing data when the data has been updated, according to embodiments as disclosed herein. The re-containerization module 203, on being triggered by the de-containerization module 202, monitors (1001) the de-containerized data. The re-containerization module 203 can use a suitable means such as filter drivers, file system watchers, application plugins (wherein the application can be used by the user to access the data), file/data scanning or any other equivalent means to monitor the data. On detecting (1002) any modifications to the data, the re-containerization module 203 captures (1003) the data. The re-containerization module 203 can capture the data in real-time. The re-containerization module 203 can also capture the data at pre-defined intervals, wherein the administrator can define the pre-defined intervals. The re-containerization module 203 can also capture the data on a pre-defined event occurring, wherein the event can be the user modifying the data, and so on. On capturing the data, the re-containerization module 203 checks (1004) for duplicates in the data. On detecting any duplicates, the re-containerization module 203 removes (1005) the duplicates from the data by performing de-duplication. The re-containerization module 203 further checks (1006, 1007) if the data requires compression and encryption. The re-containerization module 203 performs (1008) compression, if the data requires compression. The re-containerization module 203 performs compression, if the administrator sets an option. The administrator can set the option such as if the data size exceeds a pre-defined limit, and so on. The controller module 502 performs (1009) encryption, if required. The administrator can define the encryption based on at least one option such as data type, data size, user and so on. The administrator can also define the encryption for all data. The encryption used by the controller module 502 can be the same encryption used originally for the data present in the data container. The encryption used by the controller module 502 can be a different encryption from the encryption used for the data present in the data container. The re-containerization module 203 triggers (1010) the containerization module 201 (directly or by providing an indication to the data module 204) by providing information such as the updated data to the containerization module 201. The containerization module 201 containerizes (1011) the updated data. The various actions in method 1000 can be performed in the order presented, in a different order or simultaneously. Further, in some embodiments, some actions listed in FIGS. 10*a* and 10*b* can be omitted.

Embodiments herein enable non-static data containers. Embodiments herein enable the updates made by a user to be containerized so that when the container is further shared with other users or the owner, the changes can be propagated without compromising the safety, control and tracking of the data if such was the intent of the container, the users and the administrators.

Embodiments herein ensure that data containers need not contain stale data anymore. If the data on the server is updated after the container was downloaded/shared and owner of the data wishes to ensure that the end users get the latest data, the embodiments herein ensure that the containers are updated automatically without any additional effort on the part of the users.

Embodiments herein are not constrained or bound to a data/file format (such as MS Office "Document Protection" or Adobe DRM and so on) and processes all types of data in the same way irrespective of the format. Embodiments herein are not bound to any native application like MS Office, Adobe Acrobat and so on. Users need not buy new applications or upgrade existing applications to have the advantages of IRM (Information Rights Management). For example, to make full use of MS Office IRM, users need to have Office 2010 or above, and this is subject to change in the future.

Embodiments herein can be implemented on any kind of device where the modules as described herein can be implemented, such as laptops, computers, mobile devices, handheld computing devices, tablets, embedded devices, firmware, hardware and so on.

The embodiments disclosed herein can be implemented through at least one software program running on at least one hardware device and performing network management functions to control the network elements. The network elements shown in FIG. 1 include blocks that can be at least one of a hardware device, or a combination of hardware device and software module.

Embodiments herein use the terms "updating", "updation", "modifying", "editing" and other equivalent terms interchangeably and it may be obvious to a person of ordinary skill in the art that the above mentioned terms denote the actions of the user in modifying the data in any manner.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for managing data containers by a data access controller, wherein the method comprising:
   capturing modified data, by the data access controller, wherein the modified data refers to modifications made to de-containerized data associated with a data container and the modified data is captured based on at least one of a continuous manner, at a pre-configured interval and an occurrence of a pre-defined event;
   de-duplicating the modified data on determining duplicates in the modified data, by the data access controller;
   checking if at least one of rights and policies enables a user to access the modified data, by the data access controller, wherein the checking to access the modified data comprises determining, by the data access controller, at least one right to be applied for any or combination of attributes associated with the modified data based on a containerization parameter involving at least one of rights associated with the modified data, and a derivation of the rights, and wherein checking is further based on one or more of user attributes, data attributes, device attributes, and access type attributes;
   de-containerizing non-modified data present in the data container for providing the access to the user for the de-containerized non-modified data on determining that the at least one of the rights and the policies does not enable the user to access the modified data, by the data access controller;
   containerizing the modified data by reflecting the modified data in the data container, by the data access controller, wherein reflecting the modified data in the data container includes at least one of modifying the non-modified data present in the data container, discarding the non-modified data present in the data container and adding the modified data to the data container.

2. The method, as claimed in claim 1, wherein the method further comprises of checking if the user is allowed to modify the de-containerized data in the data container by the data access controller.

3. The method, as claimed in claim 1, wherein enabling access to data from the data container to the user further comprises of
   checking if the data in the data container has been modified by the data access controller; and
   providing the modified data to the user by the data access controller.

4. The method, as claimed in claim 1, wherein the method further comprises of compressing the modified data by the data access controller, before containerizing the captured modified data.

5. The method, as claimed in claim 1, wherein the method further comprises of encrypting the modified data by the data access controller, before containerizing the captured modified data.

6. The method, as claimed in claim 1, wherein the method further comprises of containerizing the captured modified data based on at least one rule and policy.

7. The method as claimed in claim 1, further comprising assigning at least one of a label, a tag and a modified file name to the modified data for indicating the user about the modified data, by the data access controller, wherein the at least one of the label, the tag, and the modified file name includes information about at least one of data modified data and data modified user.

8. A system for managing data containers, wherein the system comprises:
   a data access controller configured for:
      capturing modified data, wherein the modified data refers to modifications made to de-containerized data associated with a data container and the modified data is captured based on at least one of a continuous manner, at a pre-configured interval and an occurrence of a pre-defined event;
      de-duplicating the modified data on determining duplicates in the modified data;
      checking if at least one of rights and policies enables a user to access the modified data, wherein the checking to access the modified data comprises determining, by the data access controller, at least one right to be applied for any or combination of attributes associated with the modified data based on a containerization parameter involving at least one of rights associated with the modified data, and a derivation of the rights, and wherein checking is further based on one or more of user attributes, data attributes, device attributes, and access type attributes;

decontainerizing non-modified data present in the data container for providing the access to the user for the decontainerized non-modified data on determining that the at least one of the rights and the policies does not enable the user to access the modified data;

containerizing the modified data by reflecting the modified data in the data container, wherein reflecting the modified data in the data container includes at least one of modifying the non-modified data present in the data container, discarding the non-modified data present in the data container and adding the modified data to the data container.

9. The system, as claimed in claim 8, wherein the data access controller is further configured for enabling access to data from the data container to the user by:

checking if the data in the data container has been modified; and providing the modified data to the user.

10. The system, as claimed in claim 8, wherein the data access controller is further configured for checking if the user is allowed to modify the de-containerized data in the data container.

11. The system, as claimed in claim 8, wherein the data access controller is further configured for compressing the modified data, before containerizing the captured modified data.

12. The system, as claimed in claim 8, wherein the data access controller is further configured for encrypting the modified data, before containerizing the captured modified data.

13. The system, as claimed in claim 8, wherein the data access controller is further configured for containerizing the captured modified data based on at least one rule and policy.

14. The system as claimed in claim 8, wherein the data access controller is further configured for assigning at least one of a label, a tag and a modified file name to the modified data for indicating the user about the modified data, wherein the at least one of the label, the tag and the modified file name includes information about at least one of data modified data and data modified user.

\* \* \* \* \*